United States Patent
Guo et al.

(10) Patent No.: US 10,546,232 B2
(45) Date of Patent: Jan. 28, 2020

(54) IMAGE RECOGNITION WITH PROMOTION OF UNDERREPRESENTED CLASSES

(71) Applicant: Microsoft Technology Licensing, LLC, Redmond, WA (US)

(72) Inventors: Yandong Guo, Bellevue, WA (US); Lei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 15/722,821

(22) Filed: Oct. 2, 2017

(65) Prior Publication Data

US 2019/0012526 A1    Jan. 10, 2019

Related U.S. Application Data

(60) Provisional application No. 62/528,508, filed on Jul. 4, 2017.

(51) Int. Cl.
*G06N 3/04* (2006.01)

(52) U.S. Cl.
CPC .................. *G06N 3/0454* (2013.01)

(58) Field of Classification Search
None
See application file for complete search history.

(56) References Cited

FOREIGN PATENT DOCUMENTS

CN           103778412 A      5/2014

OTHER PUBLICATIONS

Pemula, Latha. "Low-shot Visual Recognition." PhD diss., Virginia Tech, 2016. (Year: 2016).*
Hanselmann, Harald, Shen Yan, and Hermann Ney. "Deep fisher faces." In BMVC. 2017. (Year: 2017).*
Wen, Yandong, Kaipeng Zhang, Zhifeng Li, and Yu Qiao. "A discriminative feature learning approach for deep face recognition." In European conference on computer vision, pp. 499-515. Springer, Cham, 2016. (Year: 2016).*
Deng, et al., "Robust, accurate and efficient face recognition from a single training image: A uniform pursuit approach", In Journal of Pattern Recognition, vol. 43, Issue 5, May 31, 2010, pp. 1748-1762.

(Continued)

*Primary Examiner* — David Perlman
(74) *Attorney, Agent, or Firm* — Schwegman Lundberg & Woessner, P.A.

(57) ABSTRACT

Methods, systems, and computer programs are presented for a classifier that recognizes images when at least one class includes just a few training samples. One method includes identifying a training set containing samples, each sample associated with a class from many classes. Further, the method divides the training set into a base and a novel set based on the number of samples in each class, trains a first classifier with the base set, and trains a second classifier using the training set. The second classifier is trained with promotion of the novel set and based on minimizing a loss function that comprises a first term and a second term, the first term associated with a first summation for the samples of the training set, the second term associated with a second summation for the samples of the novel set. Further, the method classifies an item with the trained second classifier.

20 Claims, 8 Drawing Sheets

(56) References Cited

OTHER PUBLICATIONS

Gao, et al., "Robust Face Recognition via Multi-Scale Patch-Based Matrix Regression", In Journal of PLOS One, vol. 11, Issue 8, Aug. 15, 2016, pp. 1-19.
Yalcin, et al., "Towards Large-Scale Face Recognition Based on Videos", In Proceedings of IEEE International Conference on Computer Vision Workshops, Dec. 7, 2015, pp. 26-33.
Chen, et al., "Extended linear regression for undersampled face recognition", In Journal of Visual Communication and Image Representation, vol. 25, Issue 7, Oct. 31, 2014, pp. 1800-1809.
Mi, et al., "New Robust Face Recognition Methods Based on Linear Regression", In Journal of PLOS One, vol. 7, Issue 8, Aug. 2012, pp. 1-10.
Zhao, et al., "Large Scale Learning and Recognition of Faces in Web Videos", In Proceedings of 8th IEEE International Conference on Automatic Face and Gesture Recognition, Sep. 17, 2008, 7 pages.

* cited by examiner

IMAGE RECOGNITION WITH PROMOTION OF UNDERREPRESENTED CLASSES

CLAIM OF PRIORITY

This application claims priority from U.S. Provisional Patent Application No. 62/528,508, filed Jul. 4, 2017, and entitled "Image Recognition with Promotion of Underrepresented Classes." This provisional application is herein incorporated by reference in its entirety.

TECHNICAL FIELD

The subject matter disclosed herein generally relates to methods, systems, and programs for computer image recognition, and more particularly, methods, systems, and computer programs for item classification when at least one class includes a few training samples.

BACKGROUND

Recognizing people in images is a task that is easy for humans but much harder for computers. Being capable of recognizing a substantial number of individuals with high precision and high recall is of great value to many practical applications, such as surveillance, security, photo tagging, and celebrity recognition.

Building a large-scale face recognizer is a non-trivial effort. One challenge is to recognize people when there are few training samples, maybe even just one sample for some people. This challenge naturally exists in many real scenarios, especially when the number of persons to be recognized is very large. Although recent years have witnessed great progress in deep learning and visual recognition, computer vision systems still lack the capability of learning visual concepts from just one, or very few, examples.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
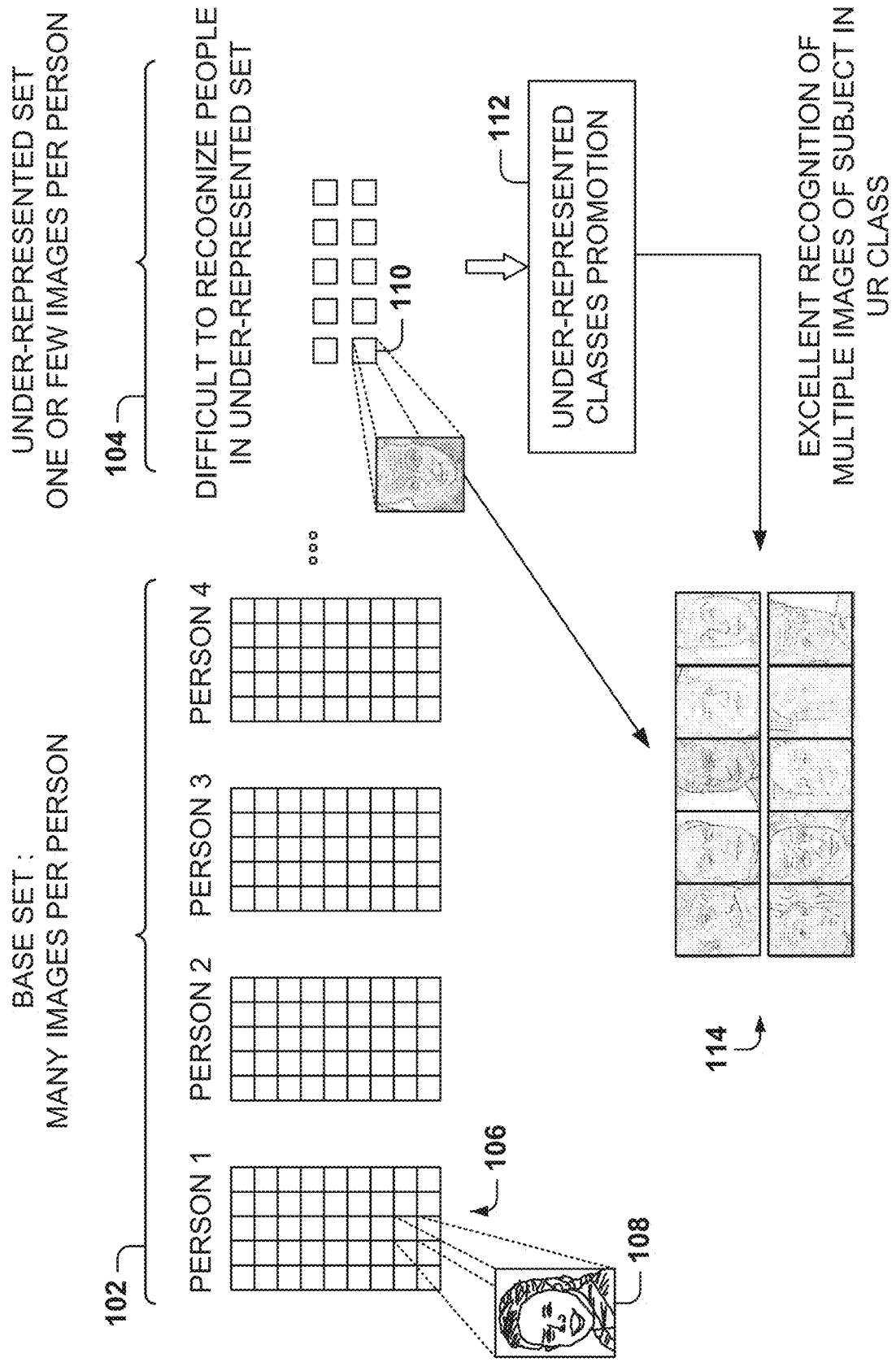
FIG. 1 illustrates the training of a classifier when some classes are underrepresented, according to some example embodiments.

Example methods, systems, and computer programs are directed to a computer classifier for recognizing images when at least one class includes just a few (e.g., one) samples for training the computer classifier. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments presented herein are directed to building a large-scale face recognizer capable of recognizing a large number of persons. Although embodiments are presented with reference to face recognition, the same principles may be utilized for any classifier to visually recognize any type of items, such as dogs, cats, animals, vehicles, scenery, monuments, articles of manufacture, manufacturing parts, etc.

A large-scale dataset is leveraged for face recognition to learn face representation. However, recognizing low-population classes is difficult, such as classes with one sample in the training set. Classes with one member are referred to herein as one-shot classes. One possible reason is due to a data imbalance problem, which cannot be effectively addressed by multinomial logistic regression (MLR), an artificial intelligence (AI) algorithm that is widely used as the final classification layer in convolutional neural networks.

To solve this problem, embodiments utilize a supervision signal called underrepresented-classes promotion (UP) loss, which aligns the norms of the weight vectors of underrepresented classes to those of the normal classes (classes with a large number of samples in the training set). In addition to the original cross-entropy loss, a new loss function effectively promotes the underrepresented classes in the learned model and leads to a remarkable improvement in face recognition performance.

With standard classification, especially with multinomial logistic regression, a class with only one training sample may claim a much smaller partition in the feature space. It has been detected that there is a close connection between the volume of a class partition in the feature space and the norm of the weight vector of this class in a multinomial linear regression model. Based on this finding, a new loss term is added to the original cross-entropy loss function used for MLR. The training set is divided into a base set and a novel set, where the base set includes items corresponding to a category with a large number of members in the training set (e.g., 25 or more, although over values are also possible), and the novel set includes items corresponding to a category with a few number of members in the training set (e.g., five or less, although over values are also possible).

This new loss term, the UP loss term, is based on the empirical assumption and observation that, on average, each person in the novel set should cover a space of similar volume in the feature space, compared with the persons in the base set. Some experimental results on a benchmark dataset of 21,000 persons show that the new loss term significantly helps improve the recognition coverage rate from 26% to 77% at the precision of 99% for underrepresented classes, while still keeping an overall top-1 accuracy of 99.8% for normal classes.

In one embodiment, a method is provided. The method includes operations for identifying a training set comprising a plurality of samples, each sample of the training set being associated with a class from a plurality of classes, and for dividing the training set into a base set and a novel set based on a number of samples in each class. Further, the method includes operations for training a first classifier with the base set and without the novel set, and for training a second classifier, using the training set, with promotion of the novel set. The training of the second classifier is based on minimizing a loss function that comprises a first term and a second term, the first term being associated with a first summation for the samples of the training set, the second term being associated with a second summation for the samples of the novel set. The method further includes classifying an item with the trained second classifier.

In another embodiment, a system comprises a memory having instructions, and one or more computer processors. The instructions, when executed by the one or more computer processors, cause the one or more computer processors to perform operations comprising: identifying a training set comprising a plurality of samples, each sample of the training set being associated with a class from a plurality of classes; dividing the training set into a base set and a novel set based on a number of samples in each class; training a first classifier with the base set and without the novel set; training a second classifier, using the training set, with promotion of the novel set, the training of the second classifier being based on minimizing a loss function that comprises a first term and a second term, the first term being associated with a first summation for the samples of the training set, the second term being associated with a second summation for the samples of the novel set; and classifying an item with the trained second classifier.

In yet another embodiment, a non-transitory machine-readable storage medium includes instructions that, when executed by a machine, cause the machine to perform operations comprising: identifying a training set comprising a plurality of samples, each sample of the training set being associated with a class from a plurality of classes; dividing the training set into a base set and a novel set based on a number of samples in each class; training a first classifier with the base set and without the novel set; training a second classifier, using the training set, with promotion of the novel set, the training of the second classifier being based on minimizing a loss function that comprises a first term and a second term, the first term being associated with a first summation for the samples of the training set, the second term being associated with a second summation for the samples of the novel set; and classifying an item with the trained second classifier.

FIG. 1 illustrates the training of a classifier when some classes are underrepresented, according to some example embodiments. A machined-learning algorithm is designed for recognizing faces. The training set for the machine-learning program is divided into a base set 102, which includes faces of people that have tens of images in the training set, and a novel set 104, also referred to as the underrepresented set, that includes images 110 of people that have one image, or few images, in the training set.

In the example embodiment of FIG. 1, person 1 includes a plurality of images 106 of person 1, such as image 108. The novel set includes images of several persons, such as image 110, but only one image of each person.

In some embodiments, a threshold number is defined, where the base set includes images of people that have a number of images above the threshold number, and the novel set includes the people at, or below, the threshold number of images. Embodiments are presented with reference to the threshold of 1, but other threshold values are also possible, such as thresholds values in the range from 1 to 20.

The goal of accurate computer face recognition is to develop an algorithm that is effective at recognizing people in both sets. The computer face recognition addresses the recognition accuracy for persons in the novel set, while making sure that the recognition accuracy for those in the base set remains high.

Embodiments presented herein define methods for training a face representation model and building a classifier for recognizing people. The base set is used to train a face representation model, which has good generalization performance on the novel set, as well as on the base set.

For testing, a collection of one million images for 20,000 persons with high accuracy was used. A standard residual network with 34 layers was used to train a classification model for these 20,000 persons. In order to evaluate the generalization performance of this model, the last pooling layer was used as the face feature and a single model accuracy of 98.88% was achieved on the Labeled Faces in the Wild (LFW) verification task. It is noted that the base set does not include any person in the LFW.

Despite the face-representation model obtained with the base set, there is a technical challenge caused by the highly imbalanced training data when building classifiers to recognize persons in both the base and the novel sets. Multinomial logistic regression (MLR) has shown good performance on various visual recognition problems. However, MLR suffers of poor performance in recognizing persons in the novel set since the persons in the novel set have much fewer images per person compared with the persons in the base set.

As described below, it has been proven that a novel class with only one training sample may only claim a very small partition in the feature space. There is a close connection between the volume of a class partition in the feature space and the norm of the weight vector of this class in the multinomial linear regression model. Based on this finding, a new loss term is added to the original cross-entropy loss for MLR, serving as a prior for the weight vectors in multinomial logistic regression.

This causes the promotion of under-represented (UR) classes 112, resulting in excellent recognition of multiple images 114 of the subjects in the UR class. Tests shown that even with only one sample in the training set, the classifier is able to recognize multiple images of the subject, even if the subject is wearing a hat or glasses, faces the camera in different angles, has images of poor quality, etc.

This new loss term is based on the empirical assumption and observation that on average, each person in the novel set should cover a space of similar volume in the feature space as the persons in the base set. We call this term the Underrepresented-classes Promotion (UP) loss.

Figure 2:
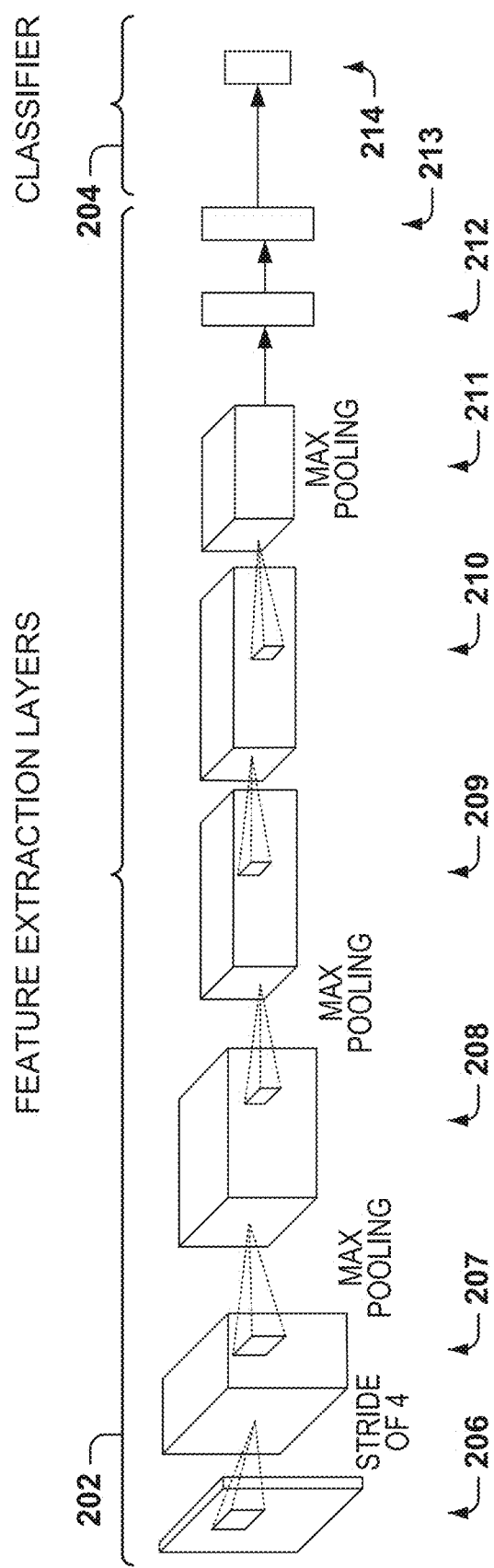
FIG. 2 illustrates the image recognition process, according to some example embodiments.

FIG. 2 illustrates the image recognition process, according to some example embodiments. Training the classifier may be divided into feature extraction layers 202 and classifier layer 204. Each image is analyzed in sequence by a plurality of layers 206-213 in the feature-extraction layers 202.

With the development of deep convolutional neural networks, the focus in face recognition has been to learn a good face feature space, in which faces of the same person are close to each other, and faces of different persons are far away from each other. For example, the verification task with the LFW dataset has been often used for face verification.

Many face identification tasks, e.g., MegaFace and LFW, are based on the similarity comparison between the images in the gallery set and the query set, which is essentially a K-nearest-neighborhood (KNN) method to estimate the persons' identity. In the ideal case, if there is a perfect face feature extractor (inter-class distance is always larger than the intra-class distance), and the KNN method is adequate to estimate the persons' identity.

For the large-scale face-recognition problem, KNN may not be the best solution because if all the face images for every person in the gallery are used, the complexity is usually too high for large scale recognition, and the gallery dataset needs to be very clean to ensure high precision.

In some example embodiments, the multinomial logistic regression (MLR) algorithm is used to estimate the persons' identity from the person' face features, but other machine-learning algorithms may be utilized. One of the advantages of MLR is that, after feature extraction, the computing complexity of estimating the persons' identity is linear with respect to the number of persons, and not with respect to the number of images in the gallery. Another advantage of MLR is that the weight vectors for each class are estimated using the information from all the classes, while in the KNN setup, the query image only needs to be close enough to one local class to be recognized.

One of the major challenge of using the MLR classifier is that the MLR classifier, trained with standard cross entropy loss, does not perform well on the novel set. To solve this problem, the (UP) term is used to improve the classifier performance on the novel set.

In some example embodiments, the training dataset used for testing is considerably larger than the publicly available datasets, except for maybe the MS-Celeb-IM dataset. The training dataset is used to train a robust, generalizable face-feature extractor and isolate the problem of one-shot learning from feature learning.

The benchmark test evaluates models with a large number of persons in order to include large variations in age, race, gender, professions, etc. Moreover, the benchmark test, used to evaluate models, uses many images per person in order to include variations in expressions, lighting, poses, etc. This enables evaluating the model's generalization ability within each person (e.g., class).

In some example embodiments, the Softmax function is used as the final layer (classifier) 214. The Softmax function, or normalized exponential function, is a generalization of the logistic function that "compresses" a K-dimensional vector z of arbitrary real values to a K-dimensional vector σ(z) of real values in the range [0, 1] and that add up to 1. The function σ(z) is calculated with the following equation:

$$\sigma(z)_j = \frac{e^{z_j}}{\sum_{k=1}^{K} e^{z_k}}, \text{ for } j = 1, \ldots, K. \quad (1)$$

In probability theory, the output of the Softmax function can be used to represent a categorical distribution, e.g., a probability distribution over K different possible outcomes. The Softmax function is used in various multiclass classification methods, such as multinomial logistic regression, multiclass linear discriminant analysis, naive Bayes classifiers, and artificial neural networks.

Figure 3:
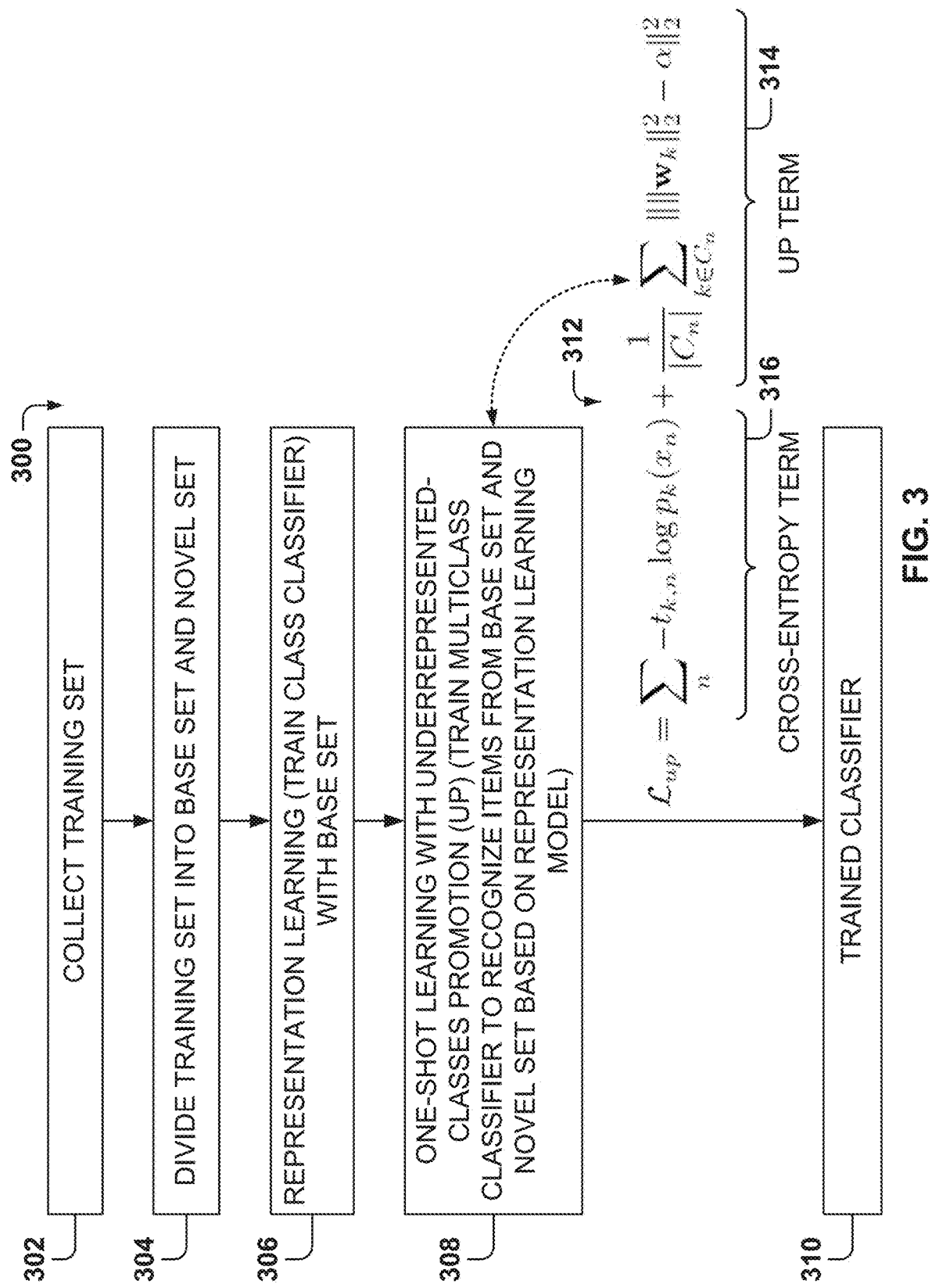
FIG. 3 is a flowchart of a method for training the classifier, according to some example embodiments.

FIG. 3 is a flowchart of a method for training the classifier, according to some example embodiments. In some example embodiments, the method includes the two phases: representation learning and one-shot learning with underrepresented-classes promotion (UP).

At operation 302, the training set is collected, where the training set includes a plurality of items and each item is assigned to a class (e.g., the training set includes images, and each person is a class). At operation 304, the training set is divided into the base set and the novel set, according to the members in each class, as discussed above.

The first phase of representation learning is performed at operation 306. Representation learning includes building a face representation model using all the training images from the base set (not including the training images from the novel set). In this first phase, a class classifier is trained using the training images of the persons in the base set. In one example embodiment, 20,000 classes are identified for 20,000 persons, with 50-100 images per person in the base set. Five images per person are excluded from the training test and saved for testing. The face areas are cropped and aligned to generate the training data.

Training is performed for a deep convolutional neural network (ConvNet) supervised by the Softmax function with cross-entropy loss. Several network structures were tested, and the standard residual network with 34 layers was selected due to a good trade-off between prediction accuracy and model complexity. The feature extracted from the last pooling layer is used as the face representation.

From operation 306, the method flows to operation 308, the second phase, referred to as the one-shot learning with underrepresented-classes promotion (UP). In this phase, a multiclass classifier is trained to recognize persons in both the base set and the novel set based on the representation model learned in phase one. The UP technology is designed to improve the recognition performance for the persons in the novel set.

In some example embodiments, a 21,000-class classifier is trained using the training data from both the base set and the novel set, treating each person as one class. There are 1,000 persons in the novel set, which is mutually exclusive from the base set. Each person in the novel set has only one image for training and 20 for testing.

In some example embodiments, the multi-class classifier is built using multinomial logistic regression based on the 34-layer residual network, the same network structure used in the feature learning phase, although other embodiments may utilize different classifiers. The parameters of the network trained in phase one are used to initialize the network for phase two, and then further fine-tuning of the network is performed in phase two.

In multinomial logistic regression with standard cross entropy loss, the probability $p_k(x_n)$ that the $n^{th}$ sample $x_n$ belongs to the $k^{th}$ class is calculated as, $$p_k(x_n) = \frac{\exp(w_k^T \phi(x_n))}{\sum_i \exp(w_i^T \phi(x_n))}, \quad (2)$$

Where $w_k$ is the weight vector for the $k^{th}$ class, the subscript i is the class index, $\phi(x_n)$ denotes the feature extractor for image $x_n$, and T refers to the transpose operation.

The bias b is not present in equation (2) because the bias term $b_k$ is set to zero. The cross entropy $\mathcal{L}$ is used as the loss function to guide the training.

$$\mathcal{L} = -\sum_n t_{k,n} \log p_k(x_n) \quad (3)$$

Where $t_{k,n}$ is the ground truth label indicating whether $x_n$ belongs to the $k^{th}$ class and $t_{k,n} \in \{0, 1\}$. Unfortunately, the loss function in equation (3) does not lead to a good performance for the persons in the novel set. In some example testing, for images in the novel set, the coverage at the precision of 99% is only 26%, while for testing images in the base set, the coverage is 100% at the precision of 99%. Additionally, in experiments with the loss function (3), the norms of the weight vectors for the novel classes are much smaller than the norms of the weight vectors for the base classes, as illustrated in FIG. 4.

Figure 4:
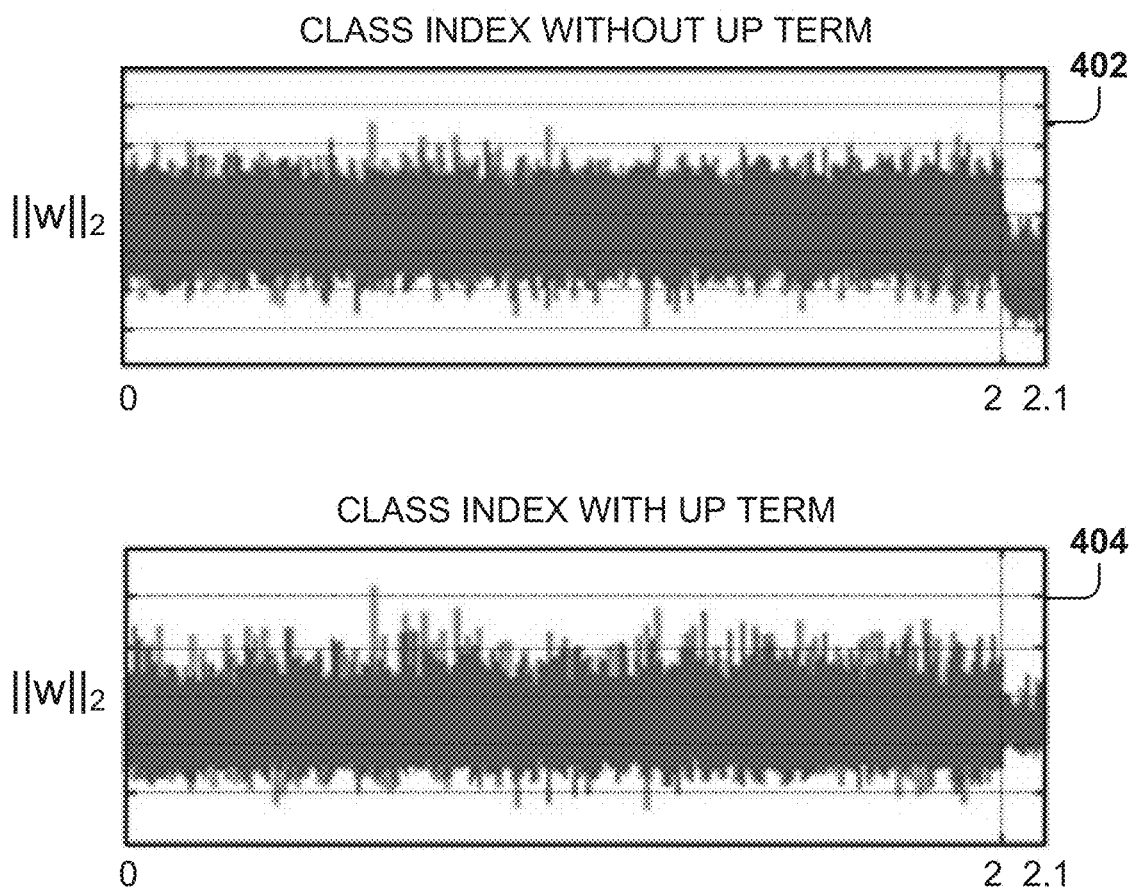
FIG. 4 illustrates the norms of the weight vectors for the base set and the noble set, according to some example embodiments.

FIG. 4 illustrates the norms of the weight vectors for the base set and the noble set, according to some example embodiments. In charts 402 and 404, the horizontal axis is the class index and the vertical axis is the norm $\|w\|_2$ of the weighting vector. The first 20K classes correspond to the base set and the next 1000 classes (from 20K to 21K) correspond to the novel set.

Chart 402 is for the class index without the UP term and chart 404 is for the class index with the UP term. As illustrated, without the UP term, the $\|w\|_2$ for the novel set is much smaller than the ones from the base set. However, with the UP term, on average, the $\|w\|_2$ for the novel set has similar values as the base set. The UP results in significant performance improvement, as discussed below.

Figure 5:
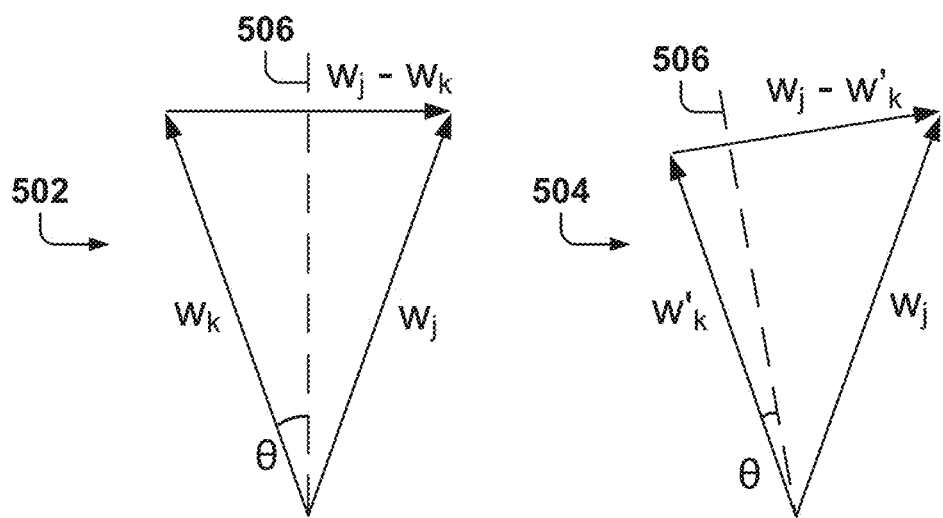
FIG. 5 illustrates the relationship between the norm of the weight vector and the volume size of the partition for one class, according to some example embodiments.

FIG. 5 illustrates the relationship between the norm of the weight vector and the volume size of the partition for one class, according to some example embodiments. The low coverage for the novel classes is related to the small values of the norms of the weight vectors for the novel classes. FIG. 5 illustrates the decision hyperplane between any two adjacent classes. It is noted that, in some example embodiments, all the bias terms $b_k$ and $b_j$ are set to 0.

Equation (2) is applied to both the $k^{th}$ class and the $j^{th}$ class to determine the decision hyperplane between the two classes:

$$\frac{p_j(x)}{p_k(x)} = \frac{\exp(w_j^T \phi(x))}{\exp(w_k^T \phi(x))} = \exp[(w_j - w_k)^T \phi(x)] \quad (4)$$

As shown in FIG. 5, the hyperplane 506 (represented by a dash line) that separates two adjacent classes k and j, is perpendicular to the vector $w_j - w_k$. Diagram 502 illustrates the case where both vectors have similar norms and the hyperplane is about halfway between the two vectors.

When the norm of $w_k$ decreases, as shown in diagram 504, the hyperplane 506 is pushed towards the $k^{th}$ class, and the volume for the $k^{th}$ class also decreases (space between $w'_k$ and hyperplane 506). As this property holds for any two classes, it is shown that there is a relationship between the norm of the weight vector and the volume size of its corresponding partition space in the feature space.

The reason why the weight vectors for the novel classes have much smaller norms is discussed next. If a convex hull is generated for the training samples of one class in the base set, typically, the volume of this convex hull is much larger than that of the convex hull of the samples for one class in the novel set. Furthermore, the weight vector wt gets updated when $p_k(x_n) \neq t_{k,n}$, according to the gradient of equation 3 with respect to $w_k$, as follows:

$$\frac{\partial L}{\partial w_k} = \sum_n (p_k(x_n) - t_{k,n}) \phi(x_n) \quad (5)$$

Therefore, with a larger convex hull coverage in the feature space, the base classes have larger chance to update their weight vectors (vs. novel classes) towards the corresponding training samples (usually in a dense ball), which leads to the fact that the classes in the base set usually have larger weight vector norms.

Returning to FIG. 3. at operation 308, the underrepresented class promotion takes place, for those classes with limited number of (or just one) samples. The UP method is based on increasing the volumes of the partitions corresponding to the novel classes in the feature space. The method introduces a new term to the loss function with the assumption that on average, the persons in the novel set and the persons in the base set should have similar volume sizes for their corresponding partitions in the feature space.

The new loss function $\mathcal{L}_{up}$ 312 is as follows:

$$\mathcal{L}_{up} = \sum_n -t_{k,n} \log p_k(x_n) + \frac{1}{|C_n|} \sum_{k \in C_n} \|\|w_k\|_2^2 - \alpha\|_2^2 \quad (6)$$

In equation (6), $\alpha$ is the average of the squared norms of weight vectors for the base classes:

$$\alpha = \frac{1}{|C_b|} \sum_{k \in C_b} \|w_k\|_2^2 \quad (7)$$

$C_b$ denotes the sets of the class indices for the base set and $C_n$ denotes the sets of the class indices for the novel set. As shown in equation (6), the average of the squared norms of the weight vectors in the novel set is promoted to the average of the squared norms of the weight vectors for the base set. The UP term 314 is introduced to promote the novel set. Thus, the cross-entropy term 316 and the UP loss term are jointly optimized. The derivative sent back for back propagation is the summation of the derivative of cross entropy and the derivative of the UP term. The rest of the optimization is the optimization for a regular deep convolutional neural network. The result is the trained classifier 310.

With the loss function of equation (6), the vectors on the norm class are aimed at having a similar size as the vectors on the base class. In some test results, it can be observed that the vectors of the novel class have larger norms than without the UP term, and similar norms to the vectors of the base class, as illustrated in chart 404 of FIG. 4.

Thus, the loss function $\mathcal{L}_{up}$ 312 comprises a first term 316 and a second term 314, the first term being associated with a first summation for the samples of the training set, and the second term being associated with a second summation for the samples of the novel set.

In other example embodiments, other loss functions may be utilized to promote underrepresented classes. Adding extra terms of $w_k$ to the cost function is essential to inject prior knowledge to the system. Different assumptions or observations yield to different prior terms to the weighting vectors.

In one example embodiment, to handle insufficient data problem for regression and classification problems $w_k$ is shrunk, by choosing the L2-norm option for optimization efficiency, as follows:

$$\mathcal{L}_{l2} = \sum_n -t_{k,n} \log p_k(x_n) + \sum_k \|w_k\|_2^2 \qquad (8)$$

Another option is to encourage all the weight vectors to have similar or even the same norms by adopting the soft constraint on the squared norm of w, as follows:

$$\mathcal{L}_{eq} = \sum_n -t_{k,n} \log p_k(x_n) + \sum_{k \in \{C_n \cup C_b\}} \|\|w_k\|_2^2 - \beta\|_2^2 \qquad (9)$$

$$\beta = \frac{1}{|\{C_n \cup C_b\}|} \sum_{k \in \{C_n \cup C_b\}} \|w_k\|_2^2 \qquad (10)$$

It is noted that one difference between this cost function and the cost function in equation (6) is that, in equation (9), the values of the norms of all $w_k$ vectors get affected and pushed to the same value, while in equation (6), only the values of the norms of $w_k$ for novel set classes get promoted.

Figure 6:
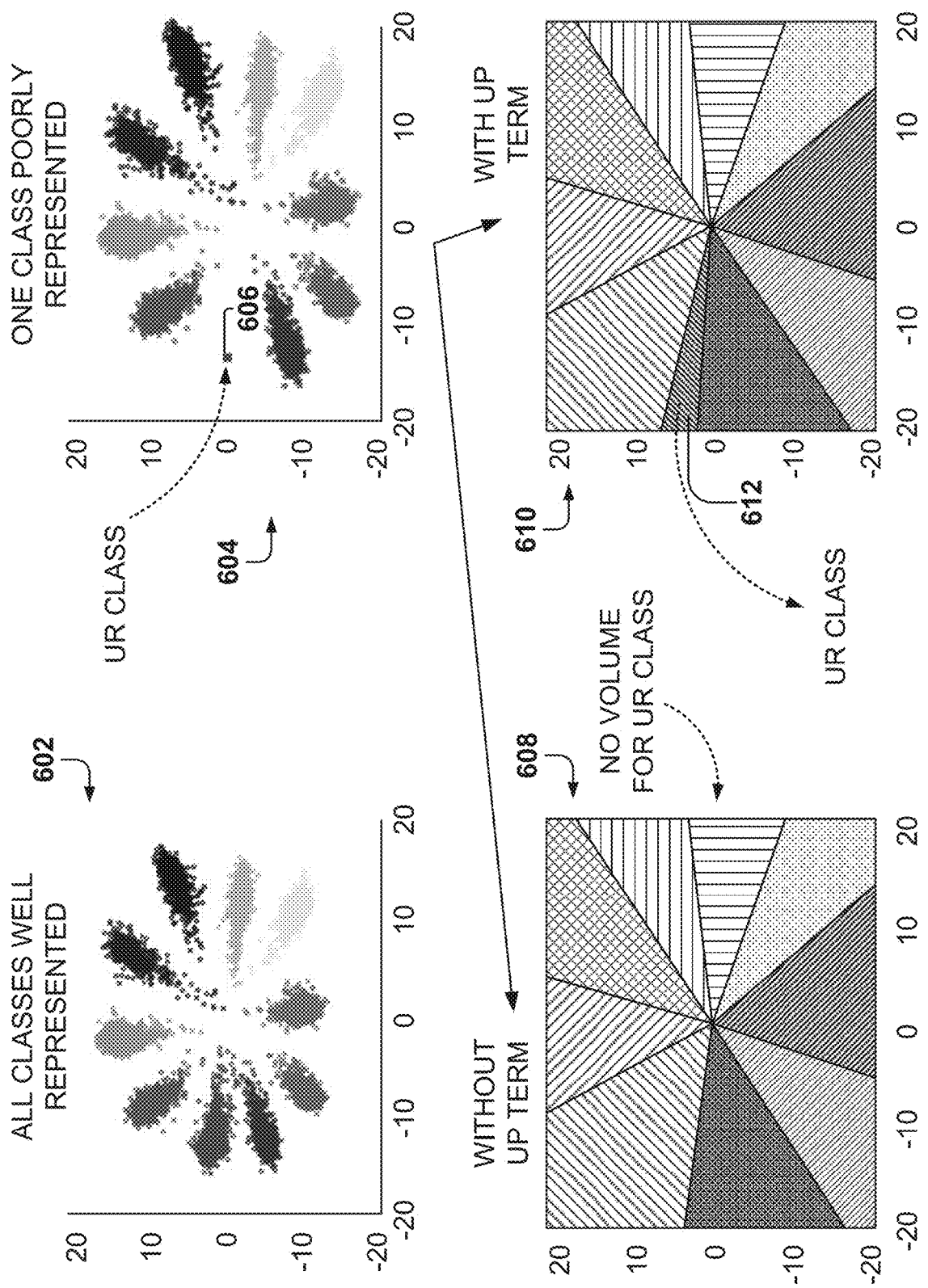
FIG. 6 illustrates results for an example with ten classes, according to some example embodiments.

FIG. 6 illustrates results for an example with ten classes, according to some embodiments. FIG. 6 illustrates results for a toy example to illustrate the performance of the UP term. Chart 602 illustrates the distribution of samples for the ideal case, where there are sufficient samples for all the classes. Each group in chart 602 represents a class that includes dots for the individual samples in the training dataset.

To visualize and illustrate the results, a toy example was constructed (with a data set referred to as the MNIST data set) with a fixed feature representation. There are ten classes in the feature space (each dot corresponds to one sample). An extreme case was simulated, as shown in chart 604. Chart 604 illustrates the case where one class has a single sample 606. In this situation, the standard multinomial logistic regression will "ignore" the underrepresented class. Chart 608 illustrates the classification results by optimizing without the UP term and shows that there is no volume for the underrepresented class.

In order to solve this under representation problem, the UP is used, with the result shown in chart 610. This is achieved by promoting the squared norm of the weight vector of the underrepresented class.

Chart 610 shows the classification results by optimizing with the UP term and shows that there is a distribution space 612 for the underrepresented class. The UP term successfully claims a reasonable volume for the underrepresented class with only one example. The corresponding norms of the weight vectors are shown in Table 1 for the one-shot class and base classes with and without the underrepresented class promotion (UP).

As shown in chart 604, there are 9 base classes, indexed from 0 to 8, and one novel class with an index of 9. The average of the norms of the weight vectors for these base classes is listed in the first row of Table 1. The result is that the norm of the weight vector effectively gets increased by the UP loss term.

TABLE 1

| | Without UP | With UP |
|---|---|---|
| $\frac{1}{9} \sum_{k \neq 9} \|w_k\|_2$ | 2.29 | 2.36 |
| $\|w_k\|_2, k = 9$ | 1.75 | 2.38 |

Figure 7:
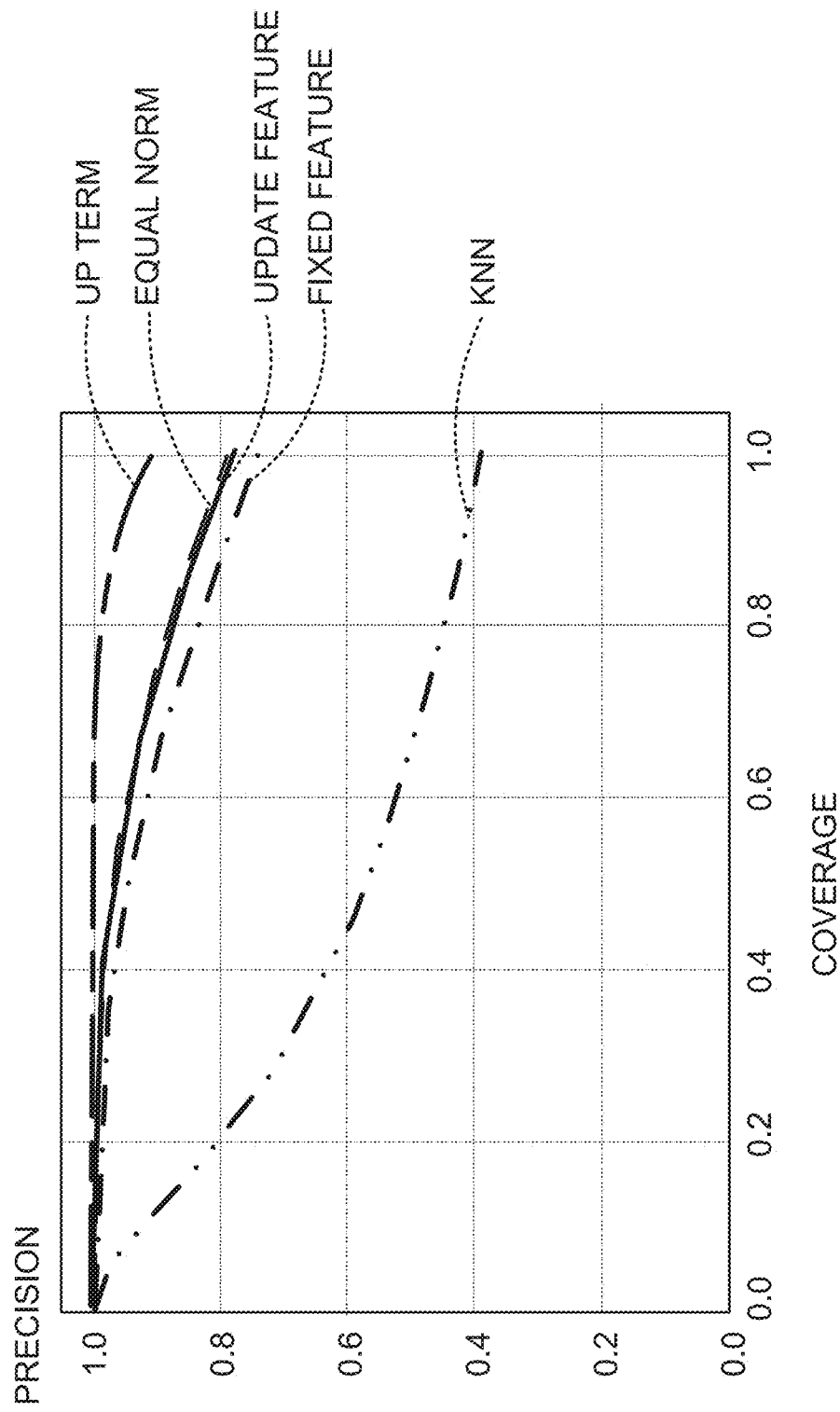
FIG. 7 is a comparison chart for the results of several recognition methods, according to some example embodiments.

FIG. 7 is a comparison chart for the results of several recognition methods, according to some example embodiments. The UP method was compared against other face recognition models and the results are represented in FIG. 7. As described above with reference to FIG. 3, a general face representation model is first trained with the training images in the base set, and then train a multi-class classification model with the training images in both the base and novel sets.

In phase two, a 21,000-class classifier was trained to recognize the persons in both the base set and the novel set. In the base set, there were 20,000 persons, each having 50-100 images for training and 5 for testing. In the novel set, there were 1000 persons, each having one image for training and 20 for testing. In total, there were 100,000 test images for the base set, and 20,000 test images for the novel set.

The training images in the novel set had a large range of variations in gender, race, ethnicity, age, camera quality (or even drawings), lighting, focus, pose, expressions, and other parameters. Coverage rate at precision 99% was used and 99.9% were used as evaluation metrics since this is a major requirement for a real recognizer.

The UP-term method described herein outperformed the other methods, which include the equal norm method (equation (9), the update feature method, the fixed feature method, and KNN. The "Update Feature" method fine-tunes the feature extractor simultaneously when the classifier is trained in phase two. The "Fixed Feature" is a method where, in phase two, the feature extractor is not updated and the classifier is trained with the feature extractor provided by phase one. The KNN method is based on the feature learned on the base set.

Figure 8:
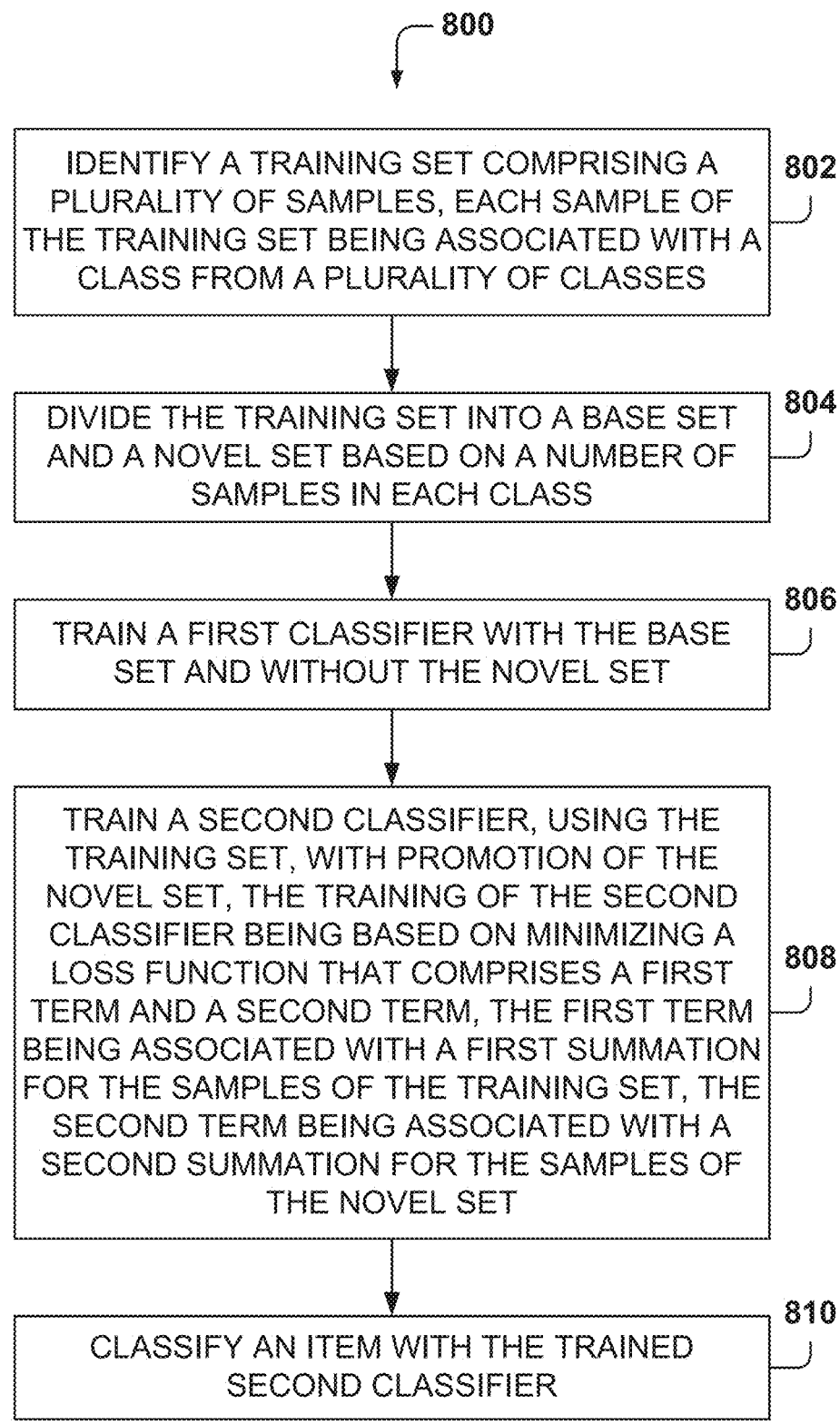
FIG. 8 is a flowchart of a method for recognizing images when at least one class includes just a few (e.g., one) samples for training the computer classifier, according to some example embodiments.

FIG. 8 is a flowchart of a method 800 for recognizing images when at least one class includes just a few (e.g., one) samples for training the computer classifier, according to some example embodiments. While the various operations in this flowchart are presented and described sequentially, one of ordinary skill will appreciate that some or all of the operations may be executed in a different order, be combined or omitted, or be executed in parallel.

Operation 802 is for identifying, by one or more processors, a training set comprising a plurality of samples, each sample of the training set being associated with a class from a plurality of classes. From operation 802, the method 800 flows to operation 804 for dividing, by the one or more processors, the training set into a base set and a novel set based on a number of samples in each class.

At operation 806, the one or more processors train a first classifier with the base set and without the novel set. From operation 806, the method 800 flows to operation 808 for training, by the one or more processors, a second classifier, using the training set. The second classifier is trained with promotion of the novel set and is based on minimizing a loss function that comprises a first term and a second term. The first term is associated with a first summation for the samples of the training set, and the second term is associated with a second summation for the samples of the novel set. See for example equation (6) described above.

From operation 808, the method 800 flows to operation 810, where the one or more processors classify an item with the trained second classifier.

In one example, training the second classifier comprises training with multinomial logistic regression using parameters, learned from training the first classifier, to initialize a neural network.

In one example, the second term is $$\frac{1}{|C_n|} \sum_{k \in C_n} |\|w_k\|_2^2 - \alpha\|_2^2,$$

where $C_n$ is a sample of the novel set, where $w_k$ is a weight vector for the $k^{th}$ class, where $\|w_k\|_2^2$ is the squared norm of the weight vector $w_k$, where $\alpha$ is equal to $$\frac{1}{|C_b|} \sum_{k \in C_b} \|w_k\|_2^2,$$

where $C_b$ is a sample of the base class.

In one example, the second term is $$\sum_k \|w_k\|_2^2,$$

where k is a sample of the novel set, where $w_k$ is a weight vector for the $k^{th}$ class, where $\|w_k\|_2^2$ is the squared norm of the weight vector $w_k$.

In one example, training the first classifier comprises training a deep neural network supervised with softmax with cross entropy loss.

In one example, the first term is a sum of $t_{k,n} \log p_k(x_n)$ for all samples n of the training set, where $$p_k(x_n) = \frac{\exp(w_k^T \phi(x_n))}{\sum_i \exp(w_i^T \phi(x_n))}.$$

In one example, dividing the training set further comprises assigning each sample to the base set when the class of the sample includes ten or more samples, and assigning each sample to the novel set when the class of the sample includes less than ten samples.

In one example, the samples are images of faces, wherein each category includes images of a same person, wherein the second classifier is utilized to recognize faces.

In one example, the loss function is equal to $$\sum_n -t_{k,n} \log p_k(x_n) + \frac{1}{|C_n|} \sum_{k \in C_n} |\|w_k\|_2^2 - \alpha\|_2^2.$$

Figure 9:
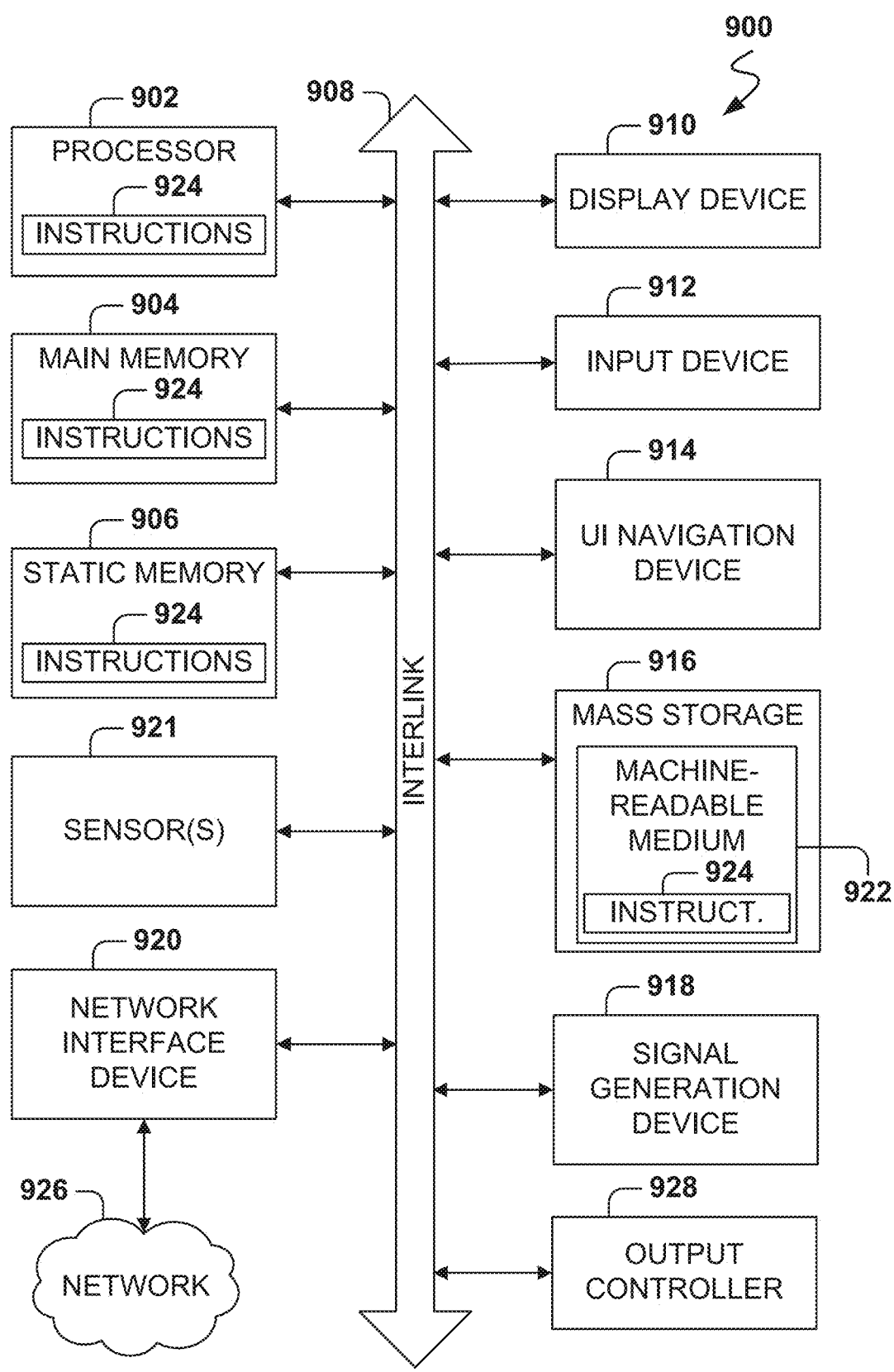
FIG. 9 is a block diagram illustrating an example of a machine upon which one or more example embodiments may be implemented.

FIG. 9 is a block diagram illustrating an example of a machine 900 upon which one or more example embodiments may be implemented. In alternative embodiments, the machine 900 may operate as a standalone device or may be connected (e.g., networked) to other machines. In a networked deployment, the machine 900 may operate in the capacity of a server machine. a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a laptop, a mobile telephone, a web appliance, a network router, switch or bridge, or any machine capable of executing instructions (sequential or otherwise) that specify actions to be taken by that machine. Further, while only a single machine 900 is illustrated, the term "machine" shall also be taken to include any collection of machines that individually or jointly execute a set (or multiple sets) of instructions to perform any one or more of the methodologies discussed herein, such as cloud computing. software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits. etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry. or by a third circuit in a second circuitry, at a different time.

The machine (e.g., computer system) 900 may include a hardware processor 902 (e.g., a central processing unit (CPU), a graphics processing unit (GPU), a hardware processor core, or any combination thereof), a main memory 904, and a static memory 906, some or all of which may communicate with each other via an interlink (e.g., bus) 908. The machine 900 may further include a display device 910, an alphanumeric input device 912 (e.g., a keyboard), and a UI navigation device 914 (e.g., a mouse). In an example, the display device 910, input device 912, and UI navigation device 914 may be a touchscreen display. The machine 900 may additionally include a mass storage device (e.g., drive unit) 916, a signal generation device 918 (e.g., a speaker), a network interface device 920, and one or more sensors 921. such as a GPS sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the mass storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that causes the machine 900 to perform any one or more of the techniques of the present disclosure, or that is capable of storing, encoding or carrying data structures used by or associated with such instructions 924. Non-limiting machine-readable medium examples may include solid-state memories, and optical and magnetic media Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, wireless data networks (e.g., Institute of Electrical and Electronics Engineers (IEEE) 902.11 family of standards known as Wi-Fi®, IEEE 902.16 family of standards known as WiMax®), IEEE 902.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing. encoding or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   identifying, by one or more processors, a training set comprising a plurality of samples, each sample of the training set being associated with a class from a plurality of classes;
   dividing, by the one or more processors, the training set into a base set and a novel set based on a number of samples in each class;
   training, by the one or more processors, a first classifier with the base set and without the novel set;
   training, by the one or more processors, a second classifier, using the training set, with promotion of the novel set, the training of the second classifier being based on minimizing a loss function that comprises a first term and a second term, the first term being associated with a first summation for the samples of the training set, the second term being associated with a second summation for the samples of the novel set; and
   classifying, by the one or more processors, an item with the trained second classifier.

2. The method as recited in claim 1, wherein training the second classifier comprises training with multinomial logistic regression using parameters, learned from training the first classifier, to initialize a neural network.

3. The method as recited in claim 1, wherein the second term is inversely proportional to a sample $C_n$ of the novel set and directly proportional to a squared norm of a weight vector $w_k$ for the $k^{th}$ class.

4. The method as recited in claim 1, wherein the second term is a sum, for the samples of the novel set, of a squared norm of a weight vector for the sample.

5. The method as recited in claim 1, wherein training the first classifier comprises training a deep neural network supervised with softmax with cross entropy loss.

6. The method as recited in claim 1, wherein the first term is a sum, for samples of the training set, of a ground truth label indicating whether the sample belongs to the $k^{th}$ class times a probability that the sample belongs to the $k^{th}$ class.

7. The method as recited in claim 1, wherein dividing the training set further comprises:
assigning each sample to the base set when the class of the sample includes ten or more samples; and
assigning each sample to the novel set when the class of the sample includes less than ten samples.

8. The method as recited in claim 1, wherein the samples are images of faces, wherein each category includes images of a same person, wherein the second classifier is utilized to recognize faces.

9. A system comprising:
a memory comprising instructions; and
one or more computer processors, wherein the instructions, when executed by the one or more computer processors, cause the one or more computer processors to perform operations comprising:
identifying a training set comprising a plurality of samples, each sample of the training set being associated with a class from a plurality of classes;
dividing the training set into a base set and a novel set based on a number of samples in each class;
training a first classifier with the base set and without the novel set;
training a second classifier, using the training set, with promotion of the novel set, the training of the second classifier being based on minimizing a loss function that comprises a first term and a second term, the first term being associated with a first summation for the samples of the training set, the second term being associated with a second summation for the samples of the novel set; and
classifying an item with the trained second classifier.

10. The system as recited in claim 9, wherein training the second classifier comprises training with multinomial logistic regression using parameters, learned from training the first classifier, to initialize a neural network.

11. The system as recited in claim 9, wherein the second term is inversely proportional to a sample $C_n$ of the novel set and directly proportional to a squared norm of a weight vector $w_k$ for the $k^{th}$ class.

12. The system as recited in claim 9, wherein the second term is a sum, for the samples of the novel set, of a squared norm of a weight vector for the sample.

13. The system as recited in claim 9, wherein training the first classifier comprises training a deep neural network supervised with softmax with cross entropy loss.

14. The system as recited in claim 9, wherein the first term is a sum, for samples of the training set, of a ground truth label indicating whether the sample belongs to the $k^{th}$ class times a probability that the sample belongs to the $k^{th}$ class.

15. The system as recited in claim 9, wherein dividing the training set further comprises:
assigning each sample to the base set when the class of the sample includes ten or more samples; and
assigning each sample to the novel set when the class of the sample includes less than ten samples.

16. A non-transitory machine-readable storage medium including instructions that, when executed by a machine, cause the machine to perform operations comprising:
identifying a training set comprising a plurality of samples, each sample of the training set being associated with a class from a plurality of classes;
dividing the training set into a base set and a novel set based on a number of samples in each class;
training a first classifier with the base set and without the novel set;
training a second classifier, using the training set, with promotion of the novel set, the training of the second classifier being based on minimizing a loss function that comprises a first term and a second term, the first term being associated with a first summation for the samples of the training set, the second term being associated with a second summation for the samples of the novel set; and
classifying an item with the trained second classifier.

17. The machine-readable storage medium as recited in claim 16, wherein training the second classifier comprises training with multinomial logistic regression using parameters, learned from training the first classifier, to initialize a neural network.

18. The machine-readable storage medium as recited in claim 16, wherein the second term is inversely proportional to a sample $C_n$ of the novel set and directly proportional to a squared norm of a weight vector $w_k$ for the $k^{th}$ class.

19. The machine-readable storage medium as recited in claim 16, wherein the second term is a sum, for the samples of the novel set, of a squared norm of a weight vector for the sample.

20. The machine-readable storage medium as recited in claim 16, wherein training the first classifier comprises training a deep neural network supervised with softmax with cross entropy loss.

* * * * *